Jan. 20, 1970  H. J. EVANS  3,491,292
STANDARD SAMPLE AND METHOD FOR SIMULATING THE EFFECT OF
MOIST PAPER AND THE LIKE ON A CAPACITIVE GAUGE
FOR DIELECTRIC MATERIALS
Filed April 28, 1967  2 Sheets-Sheet 1

INVENTOR
HOWARD J. EVANS
BY
ATTORNEY

INVENTOR
HOWARD J. EVANS
BY
ATTORNEY

United States Patent Office 3,491,292
Patented Jan. 20, 1970

3,491,292
STANDARD SAMPLE AND METHOD FOR SIMULATING THE EFFECT OF MOIST PAPER AND THE LIKE ON A CAPACITIVE GAUGE FOR DIELECTRIC MATERIALS
Howard J. Evans, Columbus, Ohio, assignor to Industrial Nucleonics Corporation, a corporation of Ohio
Filed Apr. 28, 1967, Ser. No. 634,637
Int. Cl. G01r 27/26
U.S. Cl. 324—61          11 Claims

ABSTRACT OF THE DISCLOSURE

Disclosed is a capacitive moisture measuring gauge wherein the impedance effects of a paper sheet are simulated by providing an insulating substrate having thin conductors of platinum, silver or aluminum deposited thereon. Between adjacent ones of the conductors is a sinuous resistive strip, fabricated from Nichrome, for example.

---

The present invention relates generally to systems using electrical impedance measurements for determining the moisture content of paper sheets, and more particularly to an article of manufacture for simulating the impedance characteristics of a paper sheet, as exposed to the electric field of a moisture measuring gauge.

In the paper manufacturing art, moisture of the sheet material being manufactured is generally ascertained with capacitive moisture measuring gauges. Such gauges preferably include a plurality of elongated driver electrodes, connected in parallel to be driven by an excitation source. A second set of electrodes, referred to in the art as receiver electrodes, is coupled to be responsive to a fringing field from the driver electrodes, as propagated through a sheet of paper being monitored for moisture content. The receiver electrodes are connected to feed signals to an output device, such as a meter, to provide an indication of the moisture content of the sheet being monitored.

As with all measuring equipment, impedance measuring gauges such as a capacitance gauge, for example, must be calibrated. In the prior art, it has been the general technique to calibrate moisture measuring gauges by stripping a sample of paper from the sheet being monitored after the moisture measurement was performed. The strip cut from the sheet is stored in a suitable medium so that it does not change moisture properties and is transported in the storage medium to a laboratory, where precise measurements of moisture content are made. If the precision measurements made on the cut strip differ materially from the measurements made with on-line moisture measuring gauges, the gauge may be in need of re-calibration or servicing.

In many instances, however, personnel operating moisture gauges opine that the gauge is improperly functioning from the measurements derived. Unfortunately, there is now no ready means of determining if the on-line moisture measuring equipment is properly functioning or calibrated. Hence, it is desirable to provide some means of determining whether the on-line measuring equipment is functioning properly within certain tolerable errors. Such a determination is desirably provided with a standard sample, which, when inserted in the moisture gauge field, always produces approximately the same reading on the measuring device.

The most obvious approach to providing a standard sample for the moisture properties of a sheet of paper monitored with a capacitive moisture gauge is to utilize a sample of the paper itself. Paper, however, is a very volatile material, susceptible to change of moisture content and impedance values over very large ranges, even when maintained in a controlled environment. Hence, the use of a paper sheet, even one positioned within a plastic binding, does not produce results consistent enough for a standard sample to calibrate a capacitive moisture measuring gauge approximately.

The resistive impedance of paper during manufacture is in a range outside of materials that have stable impedance characteristics. In general, the resistivity of a 4 mil thick sheet of paper is on the order of $10^7$ ohms per square, where ohms per square is a unit utilized to indicate the resistivity of any size square on a sheet having a predetermined thickness. In contrast, the resistivities of stable high resistivity thin metal and thick dielectric sheets closest to the impedance characteristics of paper are approximately $10^3$ and $10^{10}$ ohms per square, respectively. In the substantial gap between high resistivity metal and high conductance dielectric sheets, there is no stable material that can be utilized to simulate the impedance characteristics of a paper sheet.

Attempts to simulate the impedance characteristics of a paper sheet have been made by mixing particles of high resistivity metals with a binder of relatively high conductance dielectric particles. It has been found, however, that the resistivity of such mixtures varies virtually as a step function from $10^{10}$ ohms per square to $10^3$ ohms per square as a function of metal to dielectric ratio. Since a step function relationship exists between resistivity and ratio of insulating to metal particles, it has been found very difficult, and in many cases impossible, to obtain standard impedances for simulating the characteristics of paper with this approach.

According to the present invention, an article of manufacture is provided for simulating the impedance characteristics of a paper sheet in an impedance moisture gauge by coupling electric lines of force between adjacent driver and receiver electrodes to a plurality of elongated conductors. One example is a capacitance measuring gauge. The conductors have sufficient conductance and are positioned so that the shape of the electric field lines of force is not distorted by them. It is important for the electric lines of force to be unaffected by the conducting strips to simulate the impedance characteristics of a paper sheet because the relatively uniform conductance properties of the paper do not disturb the shape of the electric field lines but merely change the intensity thereof.

The electric field coupling conductors are connected to resistive metal strips, having impedance values selected so that the effective resistance between any pair of adjacent conductors approximates the resistance of the paper sheet. To this end, the resistive strips are fabricated from a high resistivity material, such as Nichrome, have thickness on the order of microns and a sinuous shape between adjacent conductors.

It is, accordingly, an object of the present invention to provide an article of manufacture for simulating the impedance characteristics of a paper sheet to an impedance moisture measuring gauge.

Another object of the present invention is to provide an article of manufacture for simulating the resistivity properties of a paper sheet having a resistivity on the order of $10^7$ ohms per square.

An additional object of the present invention is to provide an article of manufacture for enabling a capacitive moisture measuring gauge to be approximately calibrated at the site where the gauge is located, without resorting to laboratory measurements.

A further object of the invention is to provide, in combination with a capacitive moisture measuring gauge, a standard sample for simulating the impedance characteristics of a paper sheet.

The above and still further objects, features and advantages of the present invention will become apparent upon consideration of the following detailed description of one specific embodiment thereof, especially when taken in conjunction with the accompanying drawings, wherein.

Figure 1:
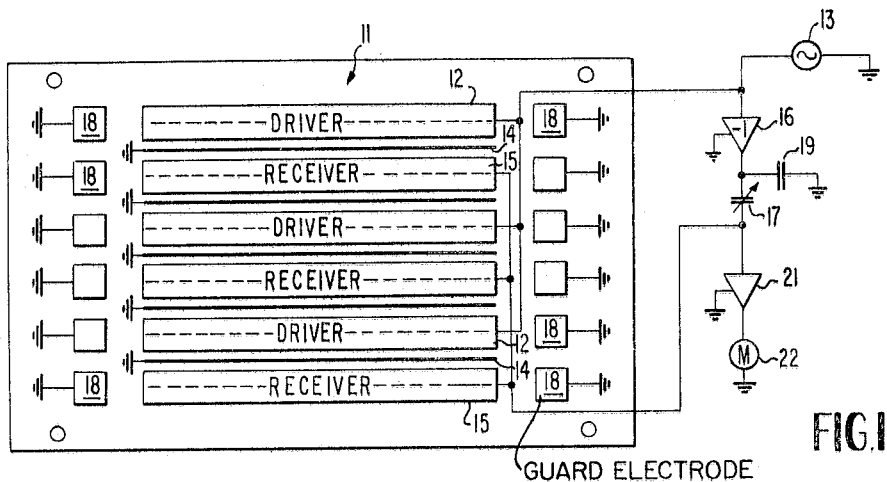
FIGURE 1 is a partially schematic illustration of a typical prior art capacitive, moisture electrode configuration with which the present invention is adapted to be utilized, in combination with excitation and readout circuitry therefor.

Reference is now made to FIGURE 1 of the drawings wherein moisture gauge 11 is illustrated as comprising a plurality of spaced, elongated driver electrodes 12, having parallel longitudinal axes. Each of the driver electrodes 12 is connected in parallel to be driven by the voltage from AC source 13. Positioned adjacent to each of driver electrodes 12 is an electrically grounded, elongated shield electrode 14, while positioned adjacent to the shield electrodes 14 are receiver electrodes 15, connected via variable or balancing capacitor 17 in parallel to the output terminal of phase inverting amplifier 16. Driver and receiver electrodes 12 and 15 are equally spaced from shield electrodes 14, and the longitudinal axes of all the electrodes are generally parallel to each other. The spacing between adjacent ones of driver and shield electrodes 12 and 15 is different for differing gauges, being in the range of approximately 20 mils to 250 mils, depending upon the impedance characteristics of the paper sheet being monitored for moisture content.

The upper surfaces of each of electrodes 12, 14, and 15 are substantially coplanar, whereby a large percentage of the electric lines of force emanating from driver electrodes 12 terminate on shield electrodes 14 and only a fringing electric field is coupled between driver electrodes 12 and receiver electrodes 15. To confine the electric fields between electrodes 12, 14, and 15 to the area immediately above the electrodes, whereby only substantially straight lines of flux subsist between the several electrodes, grounded guard electrodes 18 are positioned at both ends of each of the driver and receiver electrodes 12 and 15.

In normal operation, when gauge or head 11 is utilized for measuring the moisture content of a paper sheet or the like, the paper sheet is translated in a direction parallel to the longitudinal axes of electrodes 12, 14, and 15. The fringing field between adjacent ones of electrodes 12 and 15 is coupled to transverse sections of the sheet, whereby the paper impedance determines the voltage coupled between each of driver electrodes 12 and receiver electrodes 15. To measure the impedance of the paper sheet, variable capacitor 17 is adjusted so that under a standardized condition, a zero voltage amplitude exists between the junction of capacitor 17 with receiver electrodes 15 to ground via load capacitor 19, connected across the output of phase inverting amplifier 16.

As the impedance of the paper sheet sensed by gauge 11 varies, relative to the standardized value, the voltage at the junction between capacitor 17 and electrodes 15 changes. The variations in voltage at the junction between capacitor 17 and electrodes 15 are coupled to the input of AC amplifier 21, the output of which drives an indicator, such as voltmeter 22. Hence, the reading derived from voltmeter 22 at any instant provides an indication of the impedance of the paper sheet being monitored by gauge 11 from the standard, as established by balancing capacitor 17.

Figure 2:
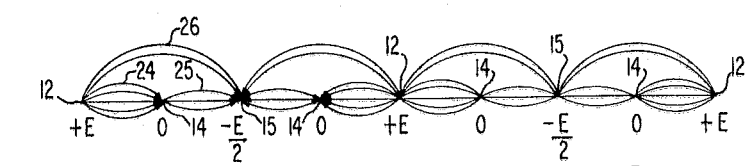
FIGURES 2 and 3 are side and top views of electric field maps utilized for providing an understanding of the present invention.
Figure 3:
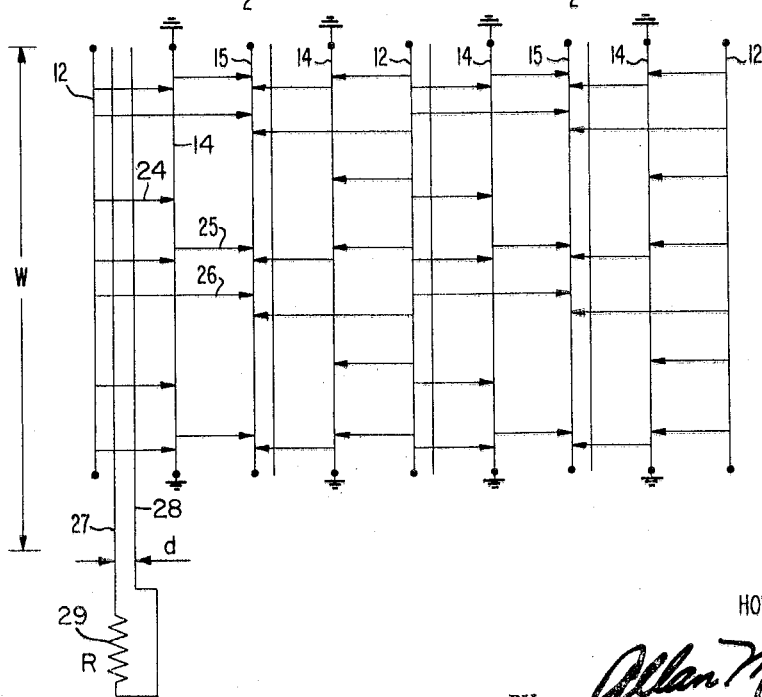

To provide an understanding of the electric fields derived with gauge 11 of FIGURE 1, reference is made to the electric field maps of FIGURES 2 and 3. The field maps of FIGURES 2 and 3 are representations of the electric field lines of force between electrodes 12, 14, and 15 at some instant of time wherein each of driver electrodes 12 is connected with AC source 13. At the time instant selected, the source voltage has amplitude of $+E$, while each of receiver electrodes 15 is assumed to be maintained at a voltage of $-E/2$. Of course, shield electrodes 14 between driver and receiver electrodes 12 and 15 are at zero potential. In response to driver and receiver electrodes 12 and 15 being energized as stated, a considerable number of electric lines of force 24 is coupled between driver electrodes 12 and shield electrodes 14, while a smaller number of lines of force 25 subsist between shield electrodes 14 and receiver electrodes 15. Electric lines of force 24 and 25 are substantially coplanar with the surfaces of driver and receiver electrodes 12, whereby substantially none of the electric lines of force 24 and 25 is coupled to the paper sheet being monitored for moisture properties.

A relatively small number of electric lines of force 26 is coupled directly between electrodes 12 and 15, without being coupled to field electrode 14. Electric lines of force 26 are coupled between electrodes 14 and 15 externally to shield 14, hence are considered as a fringing electric field. The fringing field created by electric lines of force 26 is intercepted by the paper sheet being capacitively monitored for moisture purposes, whereby the number of lines of force subsisting between electrodes 12 and 15 is a function of the moisture of the sheet.

Any line parallel to the longitudinal axes of electrodes 12, 14 and 15, such as line 27 or line 28, lies in an equipotential surface. Conductors of infinitesimal thickness and infinite conductivity lying in the equipotential surface have no effect on the electric field between electrodes 12, 14 and 15. Such a conductor can be substantially approximated with an aluminum, platinum or silver lead having a longitudinal axis parallel to the axes of electrodes 12, 14 and 15, a thickness on the order of 1 micron, and a width on the order of 2 mils in the direction at right angles to the electrodes longitudinal axes.

According to the present invention, such conductors are placed in the fringing electric fields between electrodes 12 and 15. The spacing between adjacent ones of these conductors must be appreciably smaller than the minimum expected spacing between adjacent ones of electrodes 12 and 15 and is generally on the order of 0.020 inch. Hence, according to the invention, perfect conductors of infinitesimal size are placed in the electric field between electrodes 12, 14 and 15 along lines coincident with equipotential lines 27 and 28. For purposes of convenience and simplicity, equipotential lines 27 and 28 are hereafter designated as conductors 27 and 28.

Connected between conductors 27 and 28, which lie in different equipotential surfaces, is a relatively large resistance 29. Conductors 27 and 28 couple the voltages of the equipotential lines on which they lie to resistor 29, whereby a current flows between the conductors through resistor 29. Since resistor 29 is external to the electric lines of forces 24, 25, and 26, it does not distort the shape of the lines of force, but merely changes intensity thereof in the region between conductors 27 and 28. Placing resistor 29 between electrodes 12, 14 and 15, within the electric lines of force 24–26, however, has only a slight effect on the shape of the electric field lines if the value of the resistor is sufficiently large.

Conductors 27 and 28 couple the electric lines of force between electrodes 12, 14, and 15 to resistor 29 so that the effects of the resistor are distributed everywhere in the gap between the conductors. The effective value of resistance between conductors 27 and 28, as seen by the electric field between electrodes 12 and 15, is determined by the area between the lines and the value of resistor 29 in accordance with:

$$R_{eff} = \frac{RW}{d} \quad (1)$$

where:

$R_{eff}$ is the effective resistance between conductors 27 and 28 on the electric lines of force between electrodes 12, 14, and 15;
R is the resistance of resistor 29;
W is the length of conductors 27 and 28 in the electric field between electrodes 12, 14 and 15; and
d is the separation between conductors 27 and 28.

In a typical device for simulating the impedance characteristics of a paper sheet, the values of W and d in Equation 1 are 2 inches and 0.020 inch, respectively, whereby the ratio $W/d$ has a value of 100. Hence, the effective value of resistor 29, as distributed over the area between conductors 27 and 28, is increased by two orders of magnitude. By designing resistance 29 to have a sufficiently large value, the electric field lines of force 24–26 between electrodes 12, 14 and 15 are attenuated sufficiently to simulate the impedance characteristics of a paper sheet. Since the paper sheet has substantially uniform impedance characteristics, it does not alter the shape of the electric lines of force between electrodes 12 and 15 but merely controls the number thereof. Similarly, conductors 27 and 28 do not change the electric force distribution shape, but effectively couple the value of resistance 29 over the area between them to simulate the impedance characteristics of a paper sheet.

Figure 4:
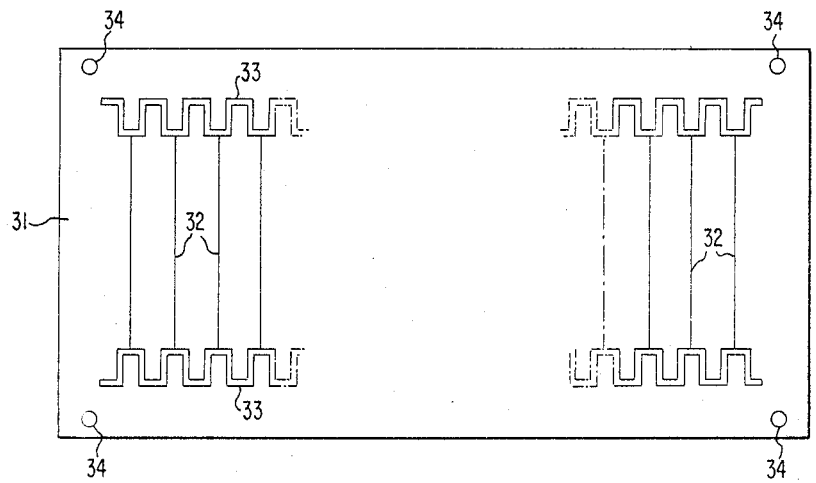
FIGURE 4 is a top view of a preferred embodiment of the standard sample for stimulating paper impedance of the present invention.

Reference is now made to FIGURE 4 of the drawings, wherein there is illustrated a top view of the standard sample of the present invention, wherein resistance 29 is designed so that conductors 27 and 28 couple an electric field to electrodes 12, 14 and 15 to simulate the electrical impedance characteristics of a paper sheet. The paper impedance simulator or standard sample of FIGURE 4 comprises a glass or quartz substrate 31 on which are deposited high conductance metal leads positioned and dimensioned to serve the same function as conductors 27 and 28, FIGURE 3. Conductors 32 are deposited on substrate 31 utilizing conventional vacuum vapor deposition deposits, whereby a thin film having a thickness on the order of 1 micron, a width of approximately 0.002 inch and a length of 2 inches is formed. Because conductors 32 are thin films, they must be high conductance metals that are not adversely affected by oxidation, such as platinum, silver or aluminum. Conductors 32 are equally spaced from each other, have parallel longitudinal axes and are a high conductivity metal, whereby the equipotential characteristics between electrodes 12, 14 and 15 are maintained. Adjacent ones of conductors 32 must be positioned to intercept the fringing field between each of driver and shield electrodes 12 and 14, as well as between each of shield and receiver electrodes 14 and 15. Hence, to enable the same sample to be utilized with the most sensitive probe, the spacing between adjacent conductors 32 is 20 mils.

At opposite ends of conductors 32 are sinuous resistive strips 33, composed of a thin film of a metal having a resistivity at least ten times that of copper, such as Nichrome. Two resistive strips 33 are provided at opposite ends of conductors 32 so that relatively constant impedance simulation effects are obtained if one of conductors 32 is fractured. If one of conductors 32 should break, the effective impedance of the gauge is increased slightly, but the gauge is generally still operable for the desired function. While the use of two resistive strips 33, rather than one, somewhat reduces the effective resistivity of the standard sample, the reduction is merely by a factor of two and has no substantial effect on the paper simulating properties of the invention.

Resistive strips 33 are vacuum vapor deposited on substrate 31 to a thickness on the order of 1 micron and have widths of 0.005 inch. Resistive strips 33 span a distance from the ends of conductors 32 almost to the outer edges of substrate 31 on the order of 0.250 inch, whereby the total length along each of the resistive strips 33 between adjacent conductors 32 is approximately 0.5 inch.

Since the resistance, R, of strips 33 between adjacent ones of conductors 32 is proportional to the ratio:

$$R = L/w$$

where:
L is the total length of each strip between adjacent ones of conductors 32; and
w is the width of strip 33;

the resistance of each strip 33 between each of conductors 32 is proportional to $$\frac{L}{w} = \frac{0.5}{.005} = 100$$

Substituting the value of 100 for $L/w$ and the value of 100 for $W/d$ into Equation 1, yields a value of effective resistivity between adjacent conductors 32 equal to $10^4$ times the resistivity of strip 33 between those conductors. Nichrome has a resistivity on the order of 100 microhm centimeters, whereby the described 1 micron thick strip 33 of Nichrome between adjacent conductors 32 is translated into an effective resistance between a pair of adjacent conductors 32 that closely simulates a sheet of relatively dry paper having a thickness on the order of 4 mils and a resistivity of $10^9$ ohm centimeters.

This conclusion is verified by noting that Nichrome has a resistivity approximately $10^6$ times less than the resistivity of a sheet of paper passing between electrodes 12, 14 and 15 and the paper strip being simulated has a thickness of approximately $10^2$ that of Nichrome strip 33. A second factor of 100 between the resistivity of the Nichrome strip and the paper sheet being simulated is established by the relatively long length of the sinuous resistive strip, while a third multiple of 100 is attained by coupling the electric field lines of force to strip resistor 33 via conductors 32 so that the lines are distributed over an area 100 times the area of the strip.

Another manner for realizing that the deposited conductor configuration of FIGURE 4 simulates the impedance characteristics of a paper sheet placed in the field of a capacitive moisture measuring gauge is to assume that substrate 31 is initially covered throughout its area with a 1 micron thick film of Nichrome having high conductivity leads 32 deposited thereon at a plurality of discrete locations, as indicated supra. Such a layer of Nichrome has a resistivity per square on the order of $10^3$ ohms per square. The terms ohms per square is one commonly employed in the thin film art as a measure of resistivity to indicate the resistance of a square of material having a predetermined thickness, i.e., a square of material, regardless of the size of the square, has a predetermined resistance dependent upon the material and the thickness of the square.

The number of squares between any of conductors 32 is equal to the length of the conductors divided by the distance between adjacent conductors, $$N = W/d,$$

where:
N is the number of squares; and
W and d have been defined supra.
The resistance of the Nichrome layer between an adjacent pair of conductors 32 is given by:

$$\frac{\text{ohms per square of the Nichrome layer}}{N}$$

Next, assume that all of the Nichrome subsisting on substrate 31, except in the regions covered by leads 32 and resistive strips 33 is etched, whereby the number of squares, $n$, remaining between any two adjacent conductors 32 is $L/2w$; the factor of two is introduced by the presence of two strips 33 between adjacent conductors 32. Since the resistivity, in ohms per square, of the Nichrome layer, both before and after the Nichrome is etched from the substrate, is the same, the resistance between any pair of conductors 32 is the ratio of the number of squares after the etching operation to the number of squares initially, i.e., $$\frac{\frac{L}{2w}}{\frac{1}{N}} = \frac{NL}{2w}$$

Since $N = W/d$, the resistance of the Nichrome layer after etching is $$M = \frac{WL}{2wd}$$

times the resistance prior to the etching operation. By substituting the values given supra for the dimensions and spacing of strips 33 and conductors 32, $$M = \frac{WL}{2wd}$$

a multiplication factor of $10^4$ is achieved. Since the resistivity of a 1 micron layer of Nichrome is approximately $10^3$ ohms per square, the effective resistivity between adjacent ones of conductors 32 is substantially $0.5 \times 10^7$ ohms per square, the approximate resistivity in ohms per square of a paper sheet 4 mils thick. Hence, it is seen that the conductor resistive strip configuration of the present invention simulates the impedance characteristics of a paper sheet exposed to a capacitive moisture measuring gauge and can be utilized as a standard sample for calibration.

To secure substrate 31 in place on a moisture measuring capacitive gauge at a position wherein conductors 32 are parallel to electrodes 12, 14 and 15, the substrate is provided with precisely positioned bores 34 at each of its four corners. When standard sample paper impedance simulating article 31 is placed in use on moisture measuring gauge 11, bores 34 are positioned in alignment with screws or studs 35, FIGURE 5, depending downwardly from the surface of the moisture measuring gauge normally exposed to the paper sheet being monitored. Positioned at the ends of studs 35 are turn key locks 36, upon which substrate 31 rests. Locks 36 positively hold substrate 31 in place, whereby conductors 32 and resistive strips 33 are separated from the exposed surfaces of electrodes 12, 14 and 15, by a distance on the order of 1 mil. Locks 36 fold into slots provided at the ends of studs 35 so that the locks and studs are retractable into the housing of gauge 11 by rotating the lower ends of the studs into the gauge. Thereby, the studs 35 and locks 36 do not interfere with the passage of paper sheet 42, FIGURE 6, to within 1 mil of the gauge electrodes during the normal monitoring operation.

To prevent moisture from reaching the surface of substrate 31 where conductors 32 and resistive strips 33 are deposited and avoid possible fracture of the conductor and resistive strip film elements, Teflon sheet 37, having a thickness of approximately 1 mil, is deposited on the face of substrate 31 carrying the conductors and resistive strips. The exposed surface of Teflon sheet 37 is pressed against electrodes 12, 14 and 15 while the standard sample is in use to maintain the same separation between the electrodes and conductors 32 and resistive strips 33 as exists between the electrodes and sheet 42 during normal operation.

Figure 5:
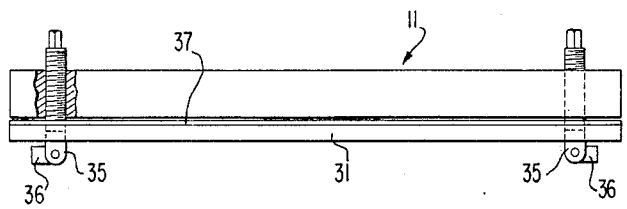
FIGURE 5 is a side view of the standard sample of FIGURE 4, as mounted on a moisture gauge.
Figure 6:
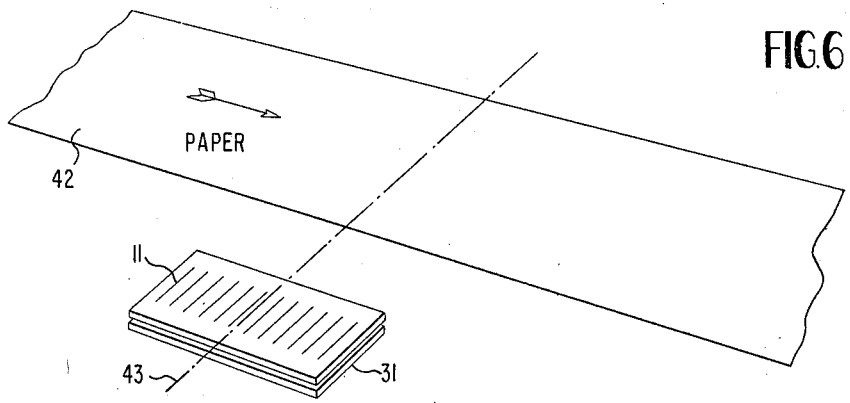
FIGURE 6 is a perspective view of a moisture gauge with the standard sample of the present invention mounted thereon in combination with a moving sheet of paper to be monitored by the gauge.

The standard sample of the present invention is generally utilized for providing a relatively accurate, on-line calibration of the moisture measuring equipment schematically illustrated by FIGURE 1 to determine if the apparatus is properly functioning. In normal use, moisture gauge 11 is mounted on a frame, not shown, and is scanned across paper sheet 42, as indicated by line 43, while the sheet is being manufactured. When an operator of the system feels that the testing or monitoring apparatus is not properly functioning, gauge 11 is positioned to one side of paper 42 and the standard sample of FIGURE 4 is connected to studs 35, as illustrated by FIGURE 5. After the paper sheet standard sample is locked in situ on studs 35 so it is responsive to the electric field of gauge 11, a reading is derived from meter 22. If the moisture measuring gauge equipment is properly functioning, meter 22 provides a predetermined response. On the contrary, if a malfunction in the monitoring equipment occurs, the reading of meter 22 is not within a predetermined range and the operator is apprised of the fact that the monitoring equipment is not properly functioning. In many instances, the operating personnel erroneously feels that the equipment is not properly functioning in which cases the standard sample impedance simulator of the present invention functions admirably as a facile article for determining that the gauge is properly operating.

Although a capacitance measuring gauge is illustrated it is apparent that other impedance measuring circuits may be employed that may utilize my standard sample for purposes of calibration or standardization.

What is claimed is:

1. As an article of manufacture, a standard sample adapted to be removably placed in the electric field of an impedance moisture measuring probe for simulating the impedance characteristics of paper thereto, said probe including a plurality of electrodes for establishing electric fields having substantially parallel lines of force intercepting at right angles substantially straight, parallel equipotential lines, said standard sample comprising a plurality of spaced, mutually insulated conductors, means for positioning each of said conductors substantially along only one of said equipotential lines, said conductors having sufficient conductance substantially to maintain the parallel relationship of the lines of force and equipotential lines when positioned along only one equipotential line, and resistance means interconnecting said conductors so as to have no substantial effect on the shape of said lines of force while coupling current from said equipotential lines to said resistance means, said resistance means having values, and adjacent ones of said conductors having insulating areas between them, dimensioned to simulate the impedance characteristics of paper.

2. The article of claim 1 wherein said resistance means comprises a thin film layer of metal having a resistivity at least 10 times the resistivity of copper, said layer having a sinuous shape for increasing the length of the resistance path between adjacent ones of said conductors.

3. The article of claim 1 wherein said conductors and resistance means are metal films having thicknesses on the order of one micron, and an insulating substrate carrying said films.

4. The article of claim 3 wherein said resistance means has a sinuous shape between adjacent ones of said conductors, said resistance means being connected to each of said conductors only at opposite ends of the conductors.

5. The article of claim 4 wherein said resistance means is a layer of Nichrome and said conductors are metals selected from the group of aluminum, platinum and silver.

6. In a moisture gauge for paper or the like, a capacitive moisture measuring probe comprising a plurality of spaced electrodes for establishing electric fields having substantially parallel lines of force intercepting at right angles substantially straight equipotential lines, and a standard sample mounted on said probe, said standard sample comprising a plurality of spaced, mutually insulated conductors, each of said conductors lying substantially along only one of said equipotential lines and having sufficient conductance substantially to maintain the parallel relationship of the lines of force and equipotential lines, and resistance means interconnecting said conductors so as to have no substantial effect on the shape of said lines of force while coupling current from said equipotential lines to said resistance means, said resistance means having values, and adjacent ones of said conductors having insulating areas between them, dimensioned to simulate the impedance characteristics of paper.

7. The system of claim 6 wherein said probe and sample include means for at will removing said sample from the mounted position on the probe.

8. The system of claim 6 wherein said conductors and resistance means are mounted on an insulating substrate having apertures, said gauge including studs for receiving said apertures and selectively locking said substrate in place relative to said electrodes to maintain each of said conductors in situ along only one of said equipotential lines.

9. The system of claim 7 wherein said resistance means and conductors are metal films having thicknesses on the order of one micron, said resistance means having a sinuous shape between adjacent ones of said conductors, said resistance means being connected to each of said conductors only at opposite ends of the conductors.

10. The system of claim 9 further including a protective insulating layer for said films on said substrate.

11. The method of testing the response of a dielectric gauge including a probe having a plurality of spaced electrodes for establishing electric fields having substantially parallel lines of force intercepting at right angles substantially straight, parallel equipotential lines, which method comprises placing adjacent to said probe a plurality of spaced, mutually insulated conductors so that each of said conductors lies substantially along only one of said equipotential lines, interconnecting said conductors with a plurality of resistors each for conducting current from one of said conductors to another and adjusting the number of and spacing between said conductors and the values of said resistors so that the array of conductors and resistors will simulate the impedance characteristics of a material normally measured by said gauge.

References Cited

UNITED STATES PATENTS 2,718,620  9/1955  Howe _____ 324—61

EDWARD E. KUBASIEWICZ, Primary Examiner

U.S. Cl. X.R.

317—246